(12) United States Patent
Bacigalupi et al.

(10) Patent No.: US 7,458,033 B2
(45) Date of Patent: Nov. 25, 2008

(54) DIRECT MANIPULATION OF TIME SCALE

(75) Inventors: Michelle Bacigalupi, San Carlos, CA (US); Nina Gilmore, Waltham, MA (US)

(73) Assignee: Oracle International Corporation, Redwood Shores, CA (US)

( * ) Notice: Subject to any disclaimer, the term of this patent is extended or adjusted under 35 U.S.C. 154(b) by 448 days.

(21) Appl. No.: 11/083,883

(22) Filed: Mar. 17, 2005

(65) Prior Publication Data

US 2006/0209069 A1 Sep. 21, 2006

(51) Int. Cl.
G06F 3/048 (2006.01)
(52) U.S. Cl. .................................... 715/772; 715/771
(58) Field of Classification Search ....................... None
See application file for complete search history.

(56) References Cited

U.S. PATENT DOCUMENTS

| | | | | |
|---|---|---|---|---|
| 6,243,105 | B1 * | 6/2001 | Hoyer et al. | 345/440 |
| 7,127,444 | B2 * | 10/2006 | Peake et al. | 707/1 |
| 2005/0114500 | A1 * | 5/2005 | Monk et al. | 709/224 |
| 2006/0149778 | A1 * | 7/2006 | Clover | 707/102 |

OTHER PUBLICATIONS

Microsoft Outlook 2000. Copyright 1995-1999.*
Microsoft Outlook 2000. Copyright Date: 2000.*

* cited by examiner

*Primary Examiner*—Doug Hutton
*Assistant Examiner*—Soumya Dasgupta
(74) *Attorney, Agent, or Firm*—Townsend and Townsend and Crew LLP (57) ABSTRACT

A method of presenting time-dependent information displays a first time scale that includes at least one first time unit and a plurality of second time units, which are subunits of the first time unit. The method displays time-dependent information according to the first time scale. A graphical drill-up control is provided for the first time unit. A graphical drill-down control is provided for each of the second time units. Actuation of the drill-up control displays a new time scale that includes at least one third time unit, of which the first time unit is a subunit, and a plurality of first time units. The method then displays the time-dependent information according to the new time scale. Actuation of the drill-down control displays a second new time scale that includes a plurality of third time units, each of which is a subunit of the second time unit. The method then displays the time-dependent information according to the second new time scale.

20 Claims, 3 Drawing Sheets

DIRECT MANIPULATION OF TIME SCALE

BACKGROUND OF THE INVENTION

The present invention relates generally to the field of computer system graphical user interfaces, and more particularly to a graphical user interface that enables direct manipulation of a time scale for the presentation of time-dependent information.

Information is typically presented in graphical or chart form. People are able to recognize relationships between different types of information or see trends in information easily when they view charts or graphs. Examples of charts and graphs, such as pie charts, bar graphs or histograms, and line graphs, are well known.

Time-dependent information is very often presented graphically in X-Y form. Usually, the X-axis represents a time scale and the X-axis represents a numerical value associated with the information. The time scale is presented in units such as years, months, days, hours, etc. The time-dependent information may be temperatures observed at particular times, the Dow Jones averages at particular times, or any other information that changes over time. Another common form of time-dependent information is project task start and finish times, which may be represented by horizontal bars on a Gantt chart.

There are a number of software applications that provide graphical displays of time-dependent information. Examples of such applications include financial and project management products. The applications may be standalone installed on a single machine, or networked running in a client-server environment, or even Web-based.

Computer displays of time-dependent information are generally static, in which the time scale is fixed. Time scales that are based on long time units, such as years, illustrate long-term trends, but they hide details of short term events. Conversely, time scales that are based on short time units, such as hours, illustrate short term events and fluctuations, but they may show trends in the information.

BRIEF SUMMARY OF THE INVENTION

An embodiment of the present invention provides a method of presenting time-dependent information in a way that allows a user to change the time scale by direct manipulation. The method displays a first time scale that includes at least one first time unit and a plurality of second time units. The second time units are subunits of said first time units. Examples of time units in general are years, quarters, months, weeks, days, and hours. A time unit may have subunits and may itself be a subunit of another time unit. For example, a month is a subunit of a quarter or a year. Weeks and days are subunits of a month. The method displays time-dependent information according to the first time scale. Examples of time-dependent information include bars in Gantt charts and graphs providing information as a function of time.

An embodiment of the method provides, for the first time unit, a graphical drill-up control. Actuation of the drill-up control displays a new time scale. The new time scale comprises at least one third time unit, of which the first time unit is a subunit, and a plurality of first time units. For example, if the first time unit is a particular month, actuation of the drill-up control will change the time scale from that month to the quarter that includes that month. The method then displays the time-dependent information according to the new time scale. Actuation of the drill-up control has the effect of displaying the time-dependent information in contracted form over a longer unit of time.

An embodiment of the method provides, for each of the second time units, a drill-down control. Actuation of the drill-down control displays a new time scale. The new time scale comprises a plurality of third time units, each of which is a subunit of the second time unit. For example, if the second time unit is a particular month of a quarter, actuation of the drill-down control will change the time scale from the quarter that includes the month, including a plurality of weeks. The method then displays the time-dependent information according to the new time scale. Actuation of the drill-down control has the effect of displaying the time-dependent information in expanded form over a longer unit of time.

DETAILED DESCRIPTION OF THE INVENTION

Figure 1:
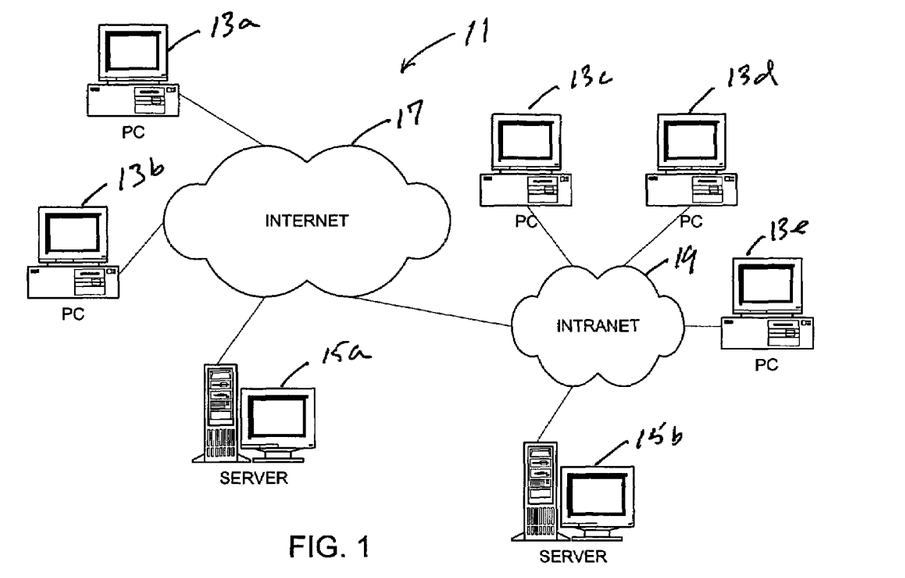
FIG. 1 is a block diagram of networks of computers.

Referring now to the drawings, and first to FIG. 1, computer systems are designated generally by the numeral 11. The computers may include desktop personal computers 13 and server machines 15. Personal computers 15 are of typical configuration, including a monitor, user input devices, such a keyboard and mouse, and various devices, such as processors, memory devices, network interface cards, and the like, all as is known to those skilled in the art. Those skilled in the art will recognize alternative configurations of computers. Computers have installed thereon an operating system, such as Microsoft Windows XP, various application software, and, preferably an Internet browser, such as Microsoft Internet Explorer.

Computers 13 may be standalone machines or they may be connected to the Internet 17, for example through dial-up or various broadband connections. Computers 13 may also be connected to a network such as intranet 19, which may in turn be connected to Internet 17.

Figure 2:
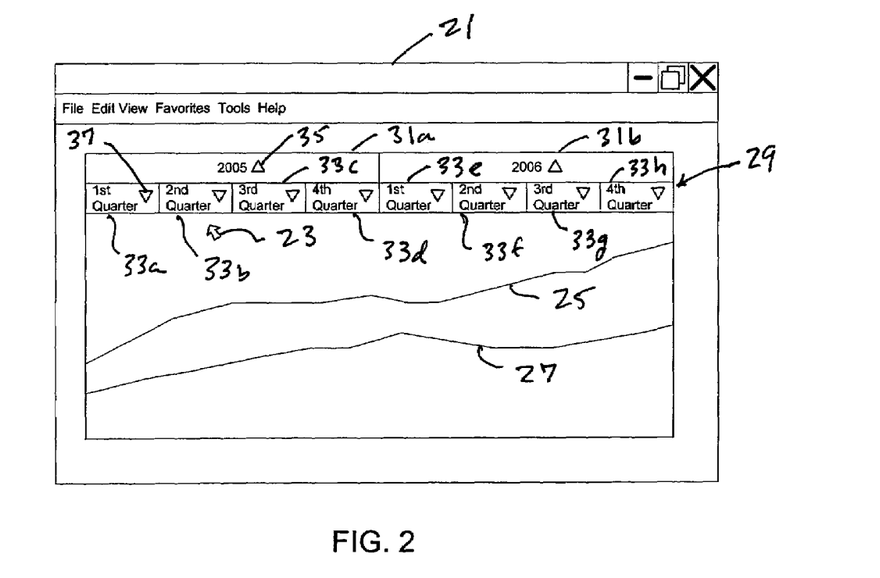
FIG. 2 is a pictorial representation of a window illustrating an embodiment of the present invention.

Referring now to FIG. 2, there is illustrated an example of a window 21 showing an example of an embodiment of the present invention. Window 21 is of the type well known in the art of graphical user interfaces. Displayed on window 21 is graphical pointer 23, which a user may operate using a well known pointing device, such as a mouse, touchpad, or the like (not shown), to select graphical objects and actuate graphical controls.

In the example of FIG. 2, window 21 displays information from a financial application, which may be resident on the user's computer, or it may a networked client-server application, or it may be a Web-based application. Window 21 displays line graphs of an organization's revenue 25 and expenses 27 over a time period according to a time scale 29. Time scale 29 includes first time units 31a and 31b. First time units 31a and 31b are the years 2005 and 2006, respectively. Thus, window 21 displays that organization's revenue 25 and expenses 27 for the years 2005 and 2006.

Time scale 29 also displays second time units 33a-33h. Second time units 33a-33h are calendar quarters. The calendar quarter second time units 33a-33h are subunits of calendar year first units 31a and 31b. Thus, window 21 provides graphical representations of revenue 25 and expense over the four quarters of each of years 2005 and 2006.

Each first time unit 31a and 31b has associated therewith a graphical drill-up control 35. Drill-up control may be actuated with pointer 23 to change the time scale of window 21 to one having a larger first time unit. For example, actuation of drill-up control 35 may cause window 21 to display a new time scale in which the first time unit is the decade that includes the year 2005. In a preferred embodiment of the invention, the new time scale would include second time units comprising the years of the decade.

Each second time unit 33a-33h has associated therewith a graphical drill-down control 37. Drill-up control may be actuated with pointer 23 to change the time scale of window 21 to one having the current second time unit as a new first time unit. Thus, actuation of drill-down control 37 will cause window 21 to display a new time scale in which the first time unit first calendar quarter of the year 2005. In a preferred embodiment of the invention, the new time scale would include second time units comprising the months or weeks of the first calendar quarter of 2005.

Figure 3:
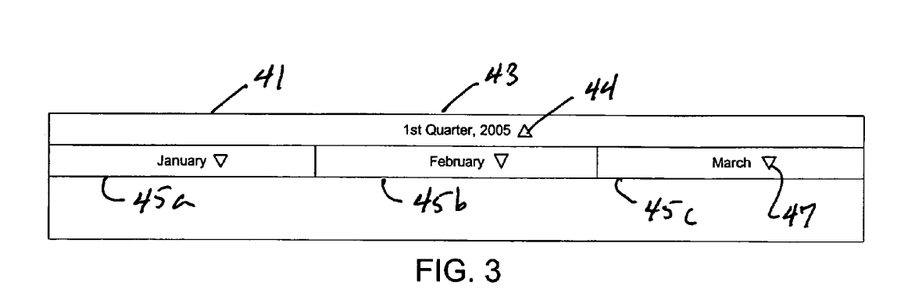
FIG. 3 is a pictorial representation illustrating a second time scale of an embodiment of the present invention.

An example of a new time scale resulting from actuation of drill-down control 37 is illustrated in FIG. 3. A new time scale 41 comprises a first time unit 43, which represents the first quarter of 2005. First time unit 43 has associated therewith a drill-up control 44. Actuation of drill up control 44 would cause the time scale to return to the one illustrated in FIG. 2. Time scale 41 also includes second time units 45a-45c, which are the months of the first calendar quarter of 2005. Second time units 45 each associated therewith a drill-down control, including a drill-down control 47 associated with the second time unit 45c.

Figure 4:
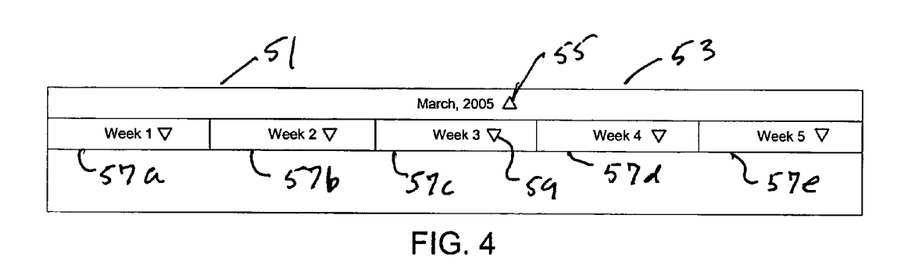
FIG. 4 is a pictorial representation illustrating a third time scale of an embodiment of the present invention.

Actuation of drill-down control 47 will cause the system to display a new time scale, an example of which is designated by the numeral 51 in FIG. 4. New time scale 51 includes a first time unit 53, which represents March, 2005. First time unit 53 has associated therewith a drill-up control 55. Actuation of drill up control 55 would cause the time scale to return to the one illustrated in FIG. 3. Time scale 51 also includes second time units 57a-57e, which represent the weeks of March, 2005. Each second time unit 57 has associated therewith a drill-down control, including a drill-down control 59 associated with the second time unit 57c. Actuation of drill-down control 59 will cause the system to display a new time scale, in which a first time unit represents the third week of March, 2005. As will be apparent from the foregoing description, the second time units for the new time scale resulting from actuation of drill-down control 59 will represent subunits on a week, such as days of the week.

Figure 5:
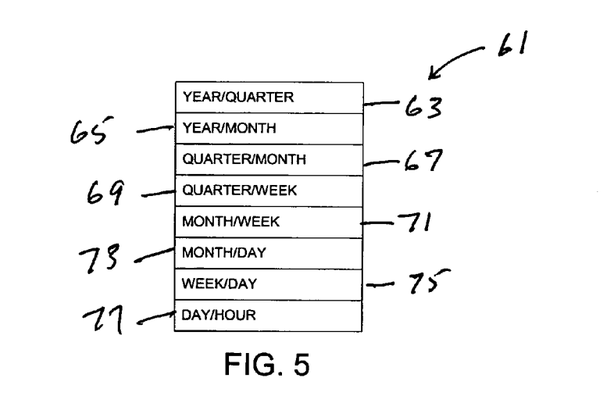
FIG. 5 is a pictorial representation illustrating a drop-down menu of an alternative embodiment of the present invention.

Referring now to FIG. 5, a graphical user interface according to the present invention may include a drop-down list or menu designated generally by the numeral 61. The selections in drop-down menu 61 represent available time scales. For example, selection of YEAR/QUARTER 63 would take the user directly to a window with the time scale of FIG. 2. Drop-down menu 61 may allow a user to navigate directly to a particular time scale without stepping through a sequence of time scales as described with reference to FIGS. 2-4. Drop-down menu 61 may also allow a user to display alternative time scales for a particular first time unit. Drop-down menu 61 may include time scale selections such as YEAR/QUARTER 63, YEAR/MONTH 65, QUARTER/MONTH 67, QUARTER/WEEK 69, MONTH/WEEK 71, MONTH/DAY 73, WEEK/DAY 75, and DAY/HOUR 77. The selections of drop-down menu 61 are in FIRST TIME UNIT/SECOND TIME UNIT format.

The selections of drop-down menu 61 represent the available time scales in an implementation of the present invention. Thus, the upper bound of available time scales in the illustrated examples is year/quarter; the lower bound is day/hour. The drill up control may be disabled at the upper bound; the drill down control may be disabled at the lower bound. As is common in graphical user interface, a disabled control may be "grayed-out" to indicate to the user that the control is not operative. It should be recognized that different or additional time scales may be implemented. For example, an implementation of the present invention may include an hour/minute time scale.

Figure 6:
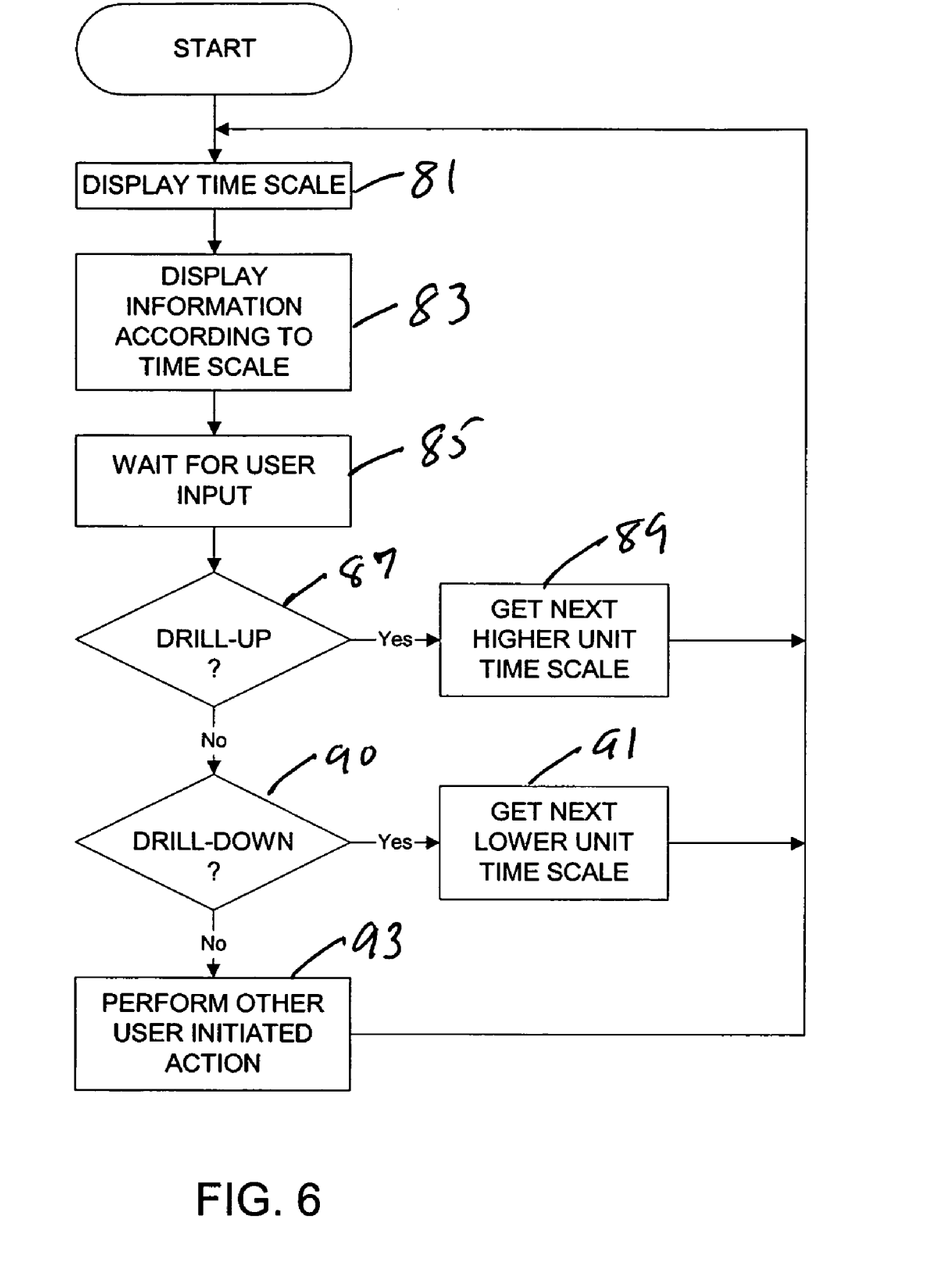
FIG. 6 is a flowchart of an embodiment of the present invention.

Referring now to FIG. 6, there is illustrated a high level flow chart of an embodiment of the present invention. The system displays a time scale, a block 81. Initially, the time scale may be a default time scale or one selected from a drop-down menu of the type described with reference to FIG. 5. The system then displays information according to the time scale, as indicated at block 83. Then, the system waits for user input, at block 85.

When the system receives user input at block 85, the system determines, at decision block 87, if the user input is actuation of a drill-up control. If so, the system gets the next higher first time unit time scale, at block 89, and processing returns to block 81. If the user input is not actuation of drill-up control, the system determines, at decision block 90, if the user input is actuation of a drill-down control. If so, the system gets the appropriate next lower first time unit time scale, at block 91, and processing returns to block 81. If the user input is not actuation of a drill-down control, the system performs other user initiated action, as indicated at block 93.

From the foregoing it may be seen that the present invention provides a method for presenting time-dependent information, wherein a user can change time scales by direct manipulation using a graphical user interface. The invention has been illustrated and described with respect to presently preferred embodiments. Those skilled in the art, given the benefit of this description will recognize alternative embodiments. For example, an embodiment of the invention may include more than two time scales, such as year, month, and week time scales, in a single view. The foregoing description is for purposes of illustration and not of limitation.

What is claimed is:

1. A method of presenting time-dependent information, which comprises:
   displaying a first time scale, said first time scale comprising a plurality of first time units and a plurality of second time units, the second time units being subunits of said first time units;
   displaying numerical time-dependent information on a graph according to said first time scale wherein the graph provides the numerical time-dependent information as a function of time;
   providing for each of said first time units a graphical drill-up control;
   providing for each of said second time units a graphical drill-down control;
   in response to actuation of a drill-down control for one of said second time units, displaying a second time scale, said second time scale comprising one of the plurality of second time units and a plurality of third time units, said third time units being subunits of said second time units; and displaying said time-dependent information on the graph according to said second time scale.

2. The method as claimed in claim 1, wherein:
said first time unit is a year; and
said second time unit is a quarter.

3. The method as claimed in claim 1, wherein:
said first time unit is a year; and
said second time unit is a month.

4. The method as claimed in claim 1, wherein:
said first time unit is a quarter; and
said second time unit is a month.

5. The method as claimed in claim 1, wherein:
said first time unit is a quarter; and
said second time unit is a week.

6. The method as claimed in claim 1, wherein:
said first time unit is a month; and
said second time unit is a week.

7. The method as claimed in claim 1, wherein:
said first time unit is a month; and
said second time unit is a week.

8. The method as claimed in claim 1, wherein:
said first time unit is a month; and
said second time unit is a day.

9. The method as claimed in claim 1, wherein:
said first time unit is a week; and
said second time unit is an hour.

10. The method as claimed in claim 1, wherein:
said first time unit is a day; and
said second time unit is an hour.

11. The method as claimed in claim 1, further comprising:
in response to actuation of a drill-up control for one of said first time units, displaying a third time scale, said third time scale comprising the first time units and a plurality of fourth time units, said first time units being subunit of said fourth time units; and
displaying said time-dependent information on the graph according to said third time scale.

12. The method as claimed in claim 11, wherein:
said first time unit is a quarter; and
said fourth time unit is a year.

13. The method as claimed in claim 11, wherein:
said first time unit is a month; and
said fourth time unit is a year.

14. The method as claimed in claim 11, wherein:
said first time unit is a month; and
said fourth time unit is a quarter.

15. The method as claimed in claim 11, wherein:
said first time unit is a week; and
said fourth time unit is a quarter.

16. The method as claimed in claim 11, wherein:
said first time unit is a week; and
said fourth time unit is a month.

17. The method as claimed in claim 11, wherein:
said first time unit is a week; and
said fourth time unit is a month.

18. The method as claimed in claim 11, wherein:
said first time unit is a day; and
said fourth time unit is a month.

19. The method as claimed in claim 11, wherein:
said first time unit is an hour; and
said fourth time unit is a week.

20. The method as claimed in claim 11, wherein:
said first time unit is an hour; and
said fourth time unit is a day.

* * * * *

UNITED STATES PATENT AND TRADEMARK OFFICE
CERTIFICATE OF CORRECTION

PATENT NO. : 7,458,033 B2  Page 1 of 5
APPLICATION NO. : 11/083883
DATED : November 25, 2008
INVENTOR(S) : Bacigalupi et al.

It is certified that error appears in the above-identified patent and that said Letters Patent is hereby corrected as shown below:

Delete Title Page showing an illustrative figure and substitute the attached Title Page therefor.

Drawing Sheet 1 of 3, delete Figs. 1 and 2, and insert Figs. 1 and 2 from the attached Replacement Drawing Sheet;

Drawing Sheet 2 of 3, delete Figs 3, 4, and 5, and insert Figs. 3, 4, and 5 from the attached Replacement Drawing Sheet; and Drawing Sheet 3 of 3, delete Fig. 6, and insert Fig. 6 from the attached Replacement Drawing Sheet.

Signed and Sealed this

Twenty-second Day of June, 2010

David J. Kappos
*Director of the United States Patent and Trademark Office*

(12) United States Patent
Bacigalupi et al.

(10) Patent No.: US 7,458,033 B2
(45) Date of Patent: Nov. 25, 2008

(54) DIRECT MANIPULATION OF TIME SCALE

(75) Inventors: Michelle Bacigalupi, San Carlos, CA (US); Nina Gilmore, Waltham, MA (US)

(73) Assignee: Oracle International Corporation, Redwood Shores, CA (US)

(*) Notice: Subject to any disclaimer, the term of this patent is extended or adjusted under 35 U.S.C. 154(b) by 448 days.

(21) Appl. No.: 11/083,883

(22) Filed: Mar. 17, 2005

(65) Prior Publication Data

US 2006/0209069 A1    Sep. 21, 2006

(51) Int. Cl.
*G06F 3/048* (2006.01)
(52) U.S. Cl. .................................. 715/772; 715/771
(58) Field of Classification Search .................. None
See application file for complete search history.

(56) References Cited

U.S. PATENT DOCUMENTS

| | | | |
|---|---|---|---|
| 6,243,105 B1* | 6/2001 | Hoyer et al. | 345/440 |
| 7,127,444 B2* | 10/2006 | Peake et al. | 707/1 |
| 2005/0114500 A1* | 5/2005 | Monk et al. | 709/224 |
| 2006/0149778 A1* | 7/2006 | Clover | 707/102 |

OTHER PUBLICATIONS

Microsoft Outlook 2000. Copyright 1995-1999.*
Microsoft Outlook 2000. Copyright Date: 2000.*

* cited by examiner

*Primary Examiner*—Doug Hutton
*Assistant Examiner*—Soumya Dasgupta
(74) *Attorney, Agent, or Firm*—Townsend and Townsend and Crew LLP (57) ABSTRACT

A method of presenting time-dependent information displays a first time scale that includes at least one first time unit and a plurality of second time units, which are subunits of the first time unit. The method displays time-dependent information according to the first time scale. A graphical drill-up control is provided for the first time unit. A graphical drill-down control is provided for each of the second time units. Actuation of the drill-up control displays a new time scale that includes at least one third time unit, of which the first time unit is a subunit, and a plurality of first time units. The method then displays the time-dependent information according to the new time scale. Actuation of the drill-down control displays a second new time scale that includes a plurality of third time units, each of which is a subunit of the second time unit. The method then displays the time-dependent information according to the second new time scale.

20 Claims, 3 Drawing Sheets